US012497497B2

United States Patent
Padada et al.

(10) Patent No.: US 12,497,497 B2
(45) Date of Patent: Dec. 16, 2025

(54) PROCESS FOR PREPARATION OF BIS-2-HYDROXYETHYLENE TEREPHTHALATE BASED NUCLEATED POLYPROPYLENE MASTERBATCH

(71) Applicant: HINDUSTAN PETROLEUM CORPORATION LIMITED, Bangalore (IN)

(72) Inventors: Srinivas Rao Padada, Bangalore (IN); Pravin Gopal Kadam, Bangalore (IN); Bennet Chelliahn, Bangalore (IN); Ramachandrarao Bojja, Bangalore (IN)

(73) Assignee: HINDUSTAN PETROLEUM CORPORATION LIMITED, Bangalore (IN)

( * ) Notice: Subject to any disclaimer, the term of this patent is extended or adjusted under 35 U.S.C. 154(b) by 519 days.

(21) Appl. No.: 18/119,226

(22) Filed: Mar. 8, 2023

(65) Prior Publication Data

US 2023/0312873 A1  Oct. 5, 2023

(30) Foreign Application Priority Data

Mar. 30, 2022 (IN) .............................. 202241019001

(51) Int. Cl.
*C08K 5/12* (2006.01)
*C08J 3/22* (2006.01)

(52) U.S. Cl.
CPC ...... *C08K 5/12* (2013.01); *C08J 3/22* (2013.01); *C08J 2323/06* (2013.01)

(58) Field of Classification Search
CPC .. C08K 5/12; C08K 5/0083; C08J 3/22; C08J 2323/06; C08J 2323/12; C08J 2323/14;
(Continued)

(56) References Cited

U.S. PATENT DOCUMENTS

2003/0236332 A1   12/2003  Dotson et al.

FOREIGN PATENT DOCUMENTS

JP         2004083899 A  *  3/2004
WO    WO-2010104628 A1  *  9/2010 ................ C08J 5/18

OTHER PUBLICATIONS

Blomenhofer "Designer Nucleating Agents for Polypropylene," Macromolecules 2005, 38, pp. 3688-3695. (Year: 2005).*

(Continued)

*Primary Examiner* — Robert S Jones, Jr.
*Assistant Examiner* — Joshua Caleb Bledsoe
(74) *Attorney, Agent, or Firm* — CANTOR COLBURN LLP

(57) ABSTRACT

The invention relates to a polypropylene based nucleating agent masterbatch and a preparation method thereof. The masterbatch is composed of, by weight, 0.1 to 60 wt. % of bis-2-hydroxyethylene terephthalate (BHETA) based nucleating agent, 40 to 99.9 wt. % parts of polypropylene. The present invention discloses a process for preparation of a polypropylene masterbatch by mixing polypropylene with a nucleating agent as represented in FIG. 1. According to the invention, the prepared polypropylene masterbatch has the advantages of being a masterbatch which can be added in any grade of polypropylene, does not cause inhalation hazards while handling, is easy to handle and has improved dispersion in the base polypropylene.

15 Claims, 2 Drawing Sheets

(58) Field of Classification Search
CPC ........ C08J 3/226; C08J 11/10; C08J 2367/02;
B29B 7/06; B29B 9/02
See application file for complete search history.

(56) References Cited

OTHER PUBLICATIONS

Xu, "The effect of nucleating agent on the crystalline morphology of polypropylene (PP)," Materials and Design 2003, 23, pp. 227-230. (Year: 2003).*
Tang, "Effects of Organic Nucleating Agents and Zinc Oxide nanoparticles on isotactic polypropylene crystallization," Polymer Communication 2004, 45, pp. 2081-2091. (Year: 2004).*
Leone, "Improving Processing, Crystallization, and Performance of Poly-L-Lactide with an amide-based organic compound as both plasticizer and nucleating agent," ACS Omega 2019, 4, pp. 10376-10387. (Year: 2019).*
Thierry and Lotz, "Chapter 8; Epitaxial Crystallization of Polymers: Means and Issues," Handbook of Polymer Crystallization 2013, first edition, pp. 237-263. (Year: 2013).*
Price, "Predicting Crystal Structures of Organic Compounds," Chem. Soc. Rev. 2014, 43, pp. 2098-2111. (Year: 2014).*
Sono, "Spin-Trapping Analysis and Characterization of Thermal Degradation of Thermoplastic Poly(ether-ester) Elastomer," Macromolecules 2018, 51, pp. 1088-1099. (Year: 2018).*
Leone et al.; Improving Processing, Crystallization, and Performance of Poly-L-lactide with an Amide-Based Organic Compound as Both Plasticizer and Nucleating Agent; ACS Omega; 2019, 4, 10376-10387.

* cited by examiner

PROCESS FOR PREPARATION OF BIS-2-HYDROXYETHYLENE TEREPHTHALATE BASED NUCLEATED POLYPROPYLENE MASTERBATCH

CROSS REFERENCE TO RELATED APPLICATION

This application claims the benefit of India application No. 202241019001, filed Mar. 30, 2022, which is hereby incorporated by reference in its entirety.

FIELD OF THE INVENTION

The present invention discloses a process for preparation of a nucleated polypropylene masterbatch. More particularly, the present invention discloses a process for preparation of a polypropylene masterbatch by melt-mixing polypropylene with bis-2-hydroxyethylene terephthalate (BHETA) as a nucleating agent.

BACKGROUND OF THE INVENTION

Nucleating agents are a set of additives added during the polymer manufacturing as it enhances the mechanical properties and transparency of the finished polymer; also providing faster crystallization rates. Nucleating agents are currently much more in demand than ever before as they help in initiating crystallization and augments the rate of production. Sufficient amount of nucleating agents allows to maintain consistent size of spherulites. Market of the nucleating agents is highly dependent upon the plastics and polymer manufacturing industry. As it is largely employed in enhancing the strength, reducing the cycle time by increasing the rate of crystallization and improving the clarification of plastics and other polymers. Nucleating agents are anticipated to grow in tandem with the plastics and polymer manufacturing industry. Growth in the packaging industry is considered as a key factor driving the global nucleating agents market for plastics and polymers.

Nils et al. in their research paper titled 'Organic Compound as Both Plasticizer and Nucleating Agent', discloses combined plasticizing and nucleating effect of BHET makes it a versatile additive for controlled processing and performance of poly-l-lactide (PLA). (Nils Leoné, Manta Roy, Sarah Saidi, Gijs de Kort, Daniel Hermida-Merino, and Carolus H. R. M. Wilsens; ACS Omega 2019 4 (6), 10376-10387; DOI: 10.1021/acsomega.9b00848)

US20030236332A1 discloses a method of nucleating a thermoplastic formulation comprising the steps of a) providing a molten thermoplastic formulation; b) introducing, either simultaneously or separately, at least one compound substantially soluble within said formulation of step "a" selected from the group consisting of at least one bicyclic compound and at least one monocycloaliphatic compound, and at least one organic salt; and c) allowing the resultant mixture in step "b" to cool to form a nucleated thermoplastic article; wherein said nucleated thermoplastic article exhibits a peak crystallization temperature in excess of that for the same thermoplastic free from any nucleation agent therein.

WO2010104628A1 discloses a masterbatch composition for use in a film, the masterbatch comprising at least 10 to 97 weight % of a polyolefin and 90 to 3 weight % of an additive composition, said additive composition comprising: (i) a hydrocarbon resin, the resin having a molecular weight lower than that of the polyolefin, and (ii) a nucleating agent for increasing the crystallization temperature of the polyolefin in comparison to a blend of said polyolefin and said additive composition in which said nucleating agent is absent.

What is needed, therefore, is to provide a polypropylene nucleating agent masterbatch composition, using bis-2-hydroxyethylene terephthalate (BHETA) as a nucleating agent, which can be added in any grade of polypropylene to obtain the required concentrations.

Objectives of the Invention

It is a primary objective of the invention to prepare a masterbatch of polypropylene (PP).

A further objective of the present invention is to produce a masterbatch of polypropylene (PP) using a nucleating agent.

Another objective of the present invention is to produce a masterbatch of polypropylene (PP) using bis-2-hydroxyethylene terephthalate (BHETA) as a nucleating agent.

SUMMARY OF THE INVENTION

In an aspect of the present invention, the present invention discloses a nucleated polypropylene masterbatch composition, comprising:
  a) a polypropylene having a melt flow index ranging in between 1.5 to 40 g/10 minute;
  b) a nucleating agent; and
  c) optionally, a dispersing agent, wherein the dispersing agent is a non-ionic surfactant.

In a feature of the present invention, the polypropylene is homopolymer and is present in an amount in a range of 40 to 99.9 wt. %.

In a feature of the present invention, the nucleating agent is bis-2-hydroxyethylene terephthalate (BHETA) and is present in an amount in a range of 0.1-60 wt. %, and the BHETA is prepared from depolymerization of waste polyethylene terephthalate (PET).

In a feature of the present invention, the dispersing agent is selected from the group consisting of as tween 20, span 60, span 80 and any combination thereof, and is present in an amount in a range of 0.01 to 10 wt. %.

In an aspect of the present invention, the present invention discloses a process for preparation of a nucleated polypropylene masterbatch composition, the process comprising the steps of:
  a) mixing a polypropylene with a nucleating agent and optionally adding a dispersing agent to form a reaction mixture;
  b) feeding the reaction mixture obtained in step i) through a hopper into a extruder;
  c) maintaining temperature from feeding zone to die zone of the extruder;
  d) cooling extrudates coming out of the extruder using a water-bath followed by granulation;
  e) drying the granules obtained in step iv) to obtain a polypropylene masterbatch.

In a feature of the present invention, the polypropylene is homopolymer and is present in an amount in a range of 40 to 99.9 wt. %.

In a feature of the present invention, the nucleating agent is bis-2-hydroxyethylene terephthalate (BHETA) and is present in an amount in a range of 0.1-60 wt. %.

In a feature of the present invention, the extruder is a twin-screw extruder and the masterbatch is prepared in a batch mixer, micro-compounder, single screw extruder or any other processing equipment.

In a feature of the present invention, the temperature in step iii) is maintained in a range of 150-300° C.

In a feature of the present invention, temperature of the water-bath in step iv) is maintained at 25° C.-30° C.

In a feature of the present invention, the drying in step v) is performed in an oven at a temperature of 90-110° C. for about 2-3 hours.

In a feature of the present invention, the polypropylene masterbatch further diluted to various concentrations using the extruder and the dilution is performed in a batch mixer, micro-compounder, single screw extruder or any other processing equipment.

In a feature of the present invention, concentration of nucleating agent is diluted in a range from 250-20000 ppm in polypropylene to prepare nucleated polypropylene.

In a feature of the present invention, the polypropylene is polypropylene homopolymer, and/or polypropylene copolymer with any other alkene or acrylate or halo-alkenes.

DETAILED DESCRIPTION OF THE INVENTION

Figure 1:
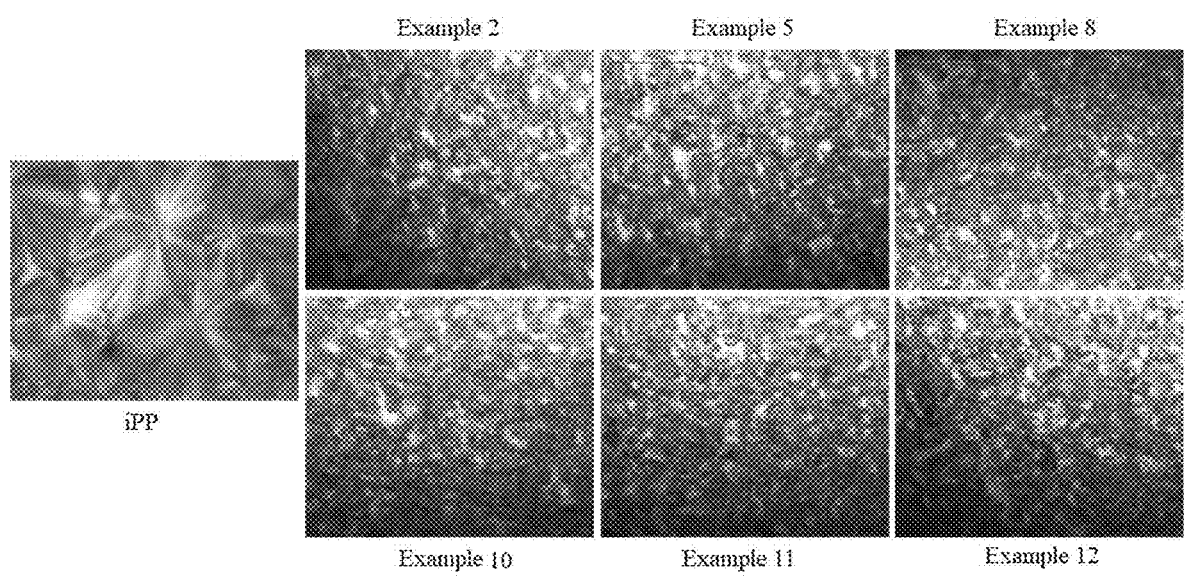
FIG. 1. Optical microscopic images obtained for the prepared examples. iPP in Example 2, Example 5, Example 8, Example 10, Example 11, and Example 12.
Figure 2:
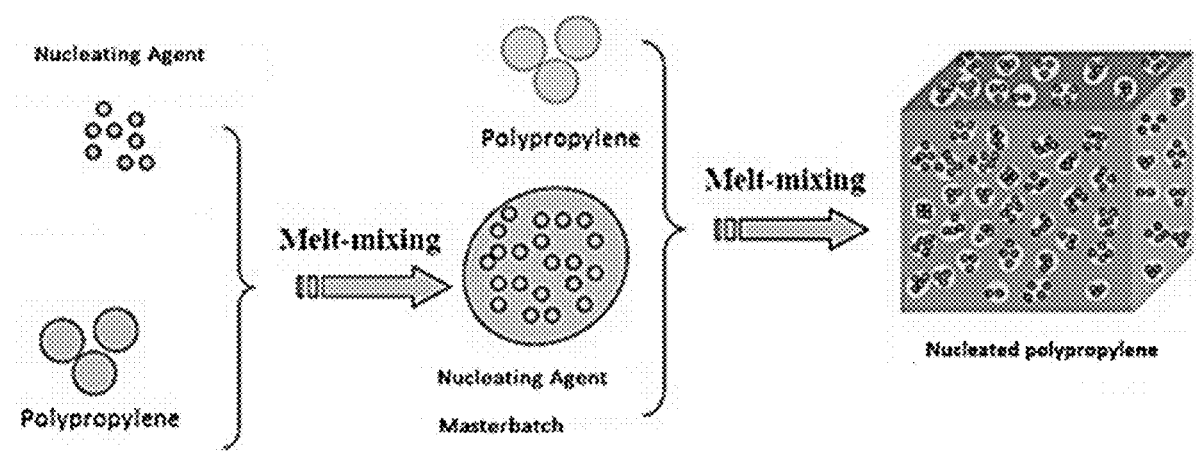
FIG. 2. Schematic for the preparation of a polypropylene based nucleating agent masterbatch.

In an aspect of the present invention, the present invention discloses a nucleated polypropylene masterbatch composition, comprising:
a) a polypropylene having a melt flow index ranging in between 1.5 to 40 g/10 minute;
b) a nucleating agent; and
c) optionally, a dispersing agent, wherein the dispersing agent is a non-ionic surfactant.

In an embodiment of the present invention, the polypropylene is homopolymer and is present in an amount in a range of 40 to 99.9 wt. %.

In an embodiment of the present invention, the nucleating agent is bis-2-hydroxyethylene terephthalate (BHETA) and is present in an amount in a range of 0.1-60 wt. %, and the BHETA is prepared from depolymerization of waste polyethylene terephthalate (PET).

In an embodiment of the present invention, the dispersing agent is selected from the group consisting of as tween 20, span 60, span 80 and any combination thereof, and is present in an amount in a range of 0.01 to 10 wt. %.

In an aspect of the present invention, the present invention discloses a process for preparation of a nucleated polypropylene masterbatch composition, the process comprising the steps of:
a) mixing a polypropylene with a nucleating agent and optionally adding a dispersing agent to form a reaction mixture;
b) feeding the reaction mixture obtained in step i) through a hopper into a extruder;
c) maintaining temperature from feeding zone to die zone of the extruder;
d) cooling extrudates coming out of the extruder using a water-bath followed by granulation;
e) drying the granules obtained in step iv) to obtain a polypropylene masterbatch.

In an embodiment of the present invention, the polypropylene is homopolymer and is present in an amount in a range of 40 to 99.9 wt. %.

In an embodiment of the present invention, the nucleating agent is bis-2-hydroxyethylene terephthalate (BHETA) and is present in an amount in a range of 0.1-60 wt. %.

In an embodiment of the present invention, the extruder is a twin-screw extruder and the masterbatch is prepared in a batch mixer, micro-compounder, single screw extruder or any other processing equipment.

In an embodiment of the present invention, the temperature in step iii) is maintained in a range of 150-300° C.

In an embodiment of the present invention, temperature of the water-bath in step iv) is maintained at 25° C.-30° C.

In an embodiment of the present invention, the drying in step v) is performed in an oven at a temperature of 90-110° C. for about 2-3 hours.

In an embodiment of the present invention, the polypropylene masterbatch further diluted to various concentrations using the extruder and the dilution is performed in a batch mixer, micro-compounder, single screw extruder or any other processing equipment.

In an embodiment of the present invention, concentration of nucleating agent is diluted in a range from 250-20000 ppm in polypropylene to prepare nucleated polypropylene.

In an embodiment of the present invention, the polypropylene is polypropylene homopolymer, and/or polypropylene copolymer with any other alkene or acrylate or halo-alkenes.

In a feature of the present invention, depolymerization of waste polyethylene terephthalate (PET) to prepare bis-2-hydroxyethylene terephthalate was performed as per the methodology of More et al. (More, A. P., Kute, R. A. and Mhaske, S. T., 2014. Chemical conversion of PET waste using ethanolamine to bis (2-hydroxyethyl) terephthalamide (BHETA) through aminolysis and a novel plasticizer for PVC. Iranian Polymer Journal, 23(1), pp. 59-67.)

Nucleating agent is added in polypropylene (PP) to prepare a masterbatch. The advantages of said masterbatch are:
Prepared masterbatch can be added in any grade of polypropylene
No inhalation of powder while handling
Easy to handle
Better dispersion in PP while dilution to requisite concentration Materials used: Polypropylene homopolymer (iPP) having MFI of 12.5 g/10 min, and density of 0.9 g/cm$^3$. Ethanol amine and zinc acetate were purchased from M/s Sigma Aldrich. Discarded PET bottles collected from market, labels and caps were removed and washed with soap solution, dried well. The bottles were cut into flakes by using cutting mill and obtained flaks were used for the depolymerization. All chemicals were used as obtained without any further modification or purification.

Polymer Processing:

Masterbatch preparation methodology: Extrusion of iPP and the prepared formulations was performed on a co-rotating twin-screw extruder (M/s. Boolani Engineering Corporation, Mumbai, India) having screw diameter of 30 mm, L/D of 48/1 and equipped with eight heating zones. Initially, PP was premixed with nucleating agent in a high-speed mixer for 5 to 20 min and then fed into the extruder through the hopper. Temperature profile in the extruder was maintained from 160 to 230° C. from feed zone to the die zone. Feeder screw and extruder screw speeds were set at 10 and 225 rpm, respectively. Extrudate was cooled by passing it through a water bath (maintained at 25° C. with continuous water circulation) and pelletized subsequently. Obtained pellets were dried in oven at 105° C. for about 2-3 hours prior to injection molding. Above mentioned masterbatch can also be prepared using batch mixer, micro-compounder, single screw extruder or any other processing equipment.

Nucleating agent masterbatch can be prepared with nucleating agent concentration ranging from 0.1 wt. % to 60 wt. %; whereas, to prepare nucleated polypropylene the prepared masterbatch can be diluted from 250 to 20000 ppm concentration. In the current disclosure concentration of the nucleating agent in the masterbatch was maintained at 10 wt. %.

Dilution of masterbatch and sample preparation: Dilution of masterbatch to prepare 500, 1000 and 2000 ppm nucleated polypropylene was performed in three ways, using:

Twin-screw extrusion process
Single-screw extrusion process
Batch mixing process Twin-screw extrusion process: Dilution of masterbatch to prepare 500 to 2000 ppm nucleated polypropylene was performed using similar processing conditions as mentioned for the extrusion process under masterbatch preparation methodology.

Single-screw extrusion process: Extrusion of iPP and the prepared masterbatch was performed on a single-screw extruder (Dr. Collins, Germany) having screw diameter of 20 mm, L/D of 30/1 and equipped with four heating zones. Initially, PP was premixed with nucleating agent masterbatch in a high-speed mixer for 5 to 20 min and then fed into the single-screw extruder through the hopper. Temperature profile in extruder was maintained from 160 to 230° C. from feed zone to the die zone. Extruder screw speed was set 60 rpm. Extrudate was cooled by passing it through a water bath (maintained at 25° C. with continuous water circulation) and pelletized subsequently. Obtained pellets were dried in oven at 105° C. for about 2-3 hours prior to injection molding.

Injection Molding process: Injection molding (M/s. Aurburg All Rounder 410C, Germany) was performed by maintaining the temperature profile from 190 to 230° C. from the hopper to the ejection nozzle. Injection pressure, packing pressure and cooling time were maintained constant at 240 bar, 1000 bar, and 20 s, respectively, throughout the molding process.

Batch mixing process: Batch mixing was performed using a banbury batchmixing chamber (M/s. HAAKE™ PolyLab™ OS system). After addition of nucleating agent masterbatch/polypropylene pre-mix, batchmixing was continued for 15 min at 230° C. and 60 rpm. Obtained mix was dried in oven at 105° C. for about 2-3 hours prior to compression molding.

Compression molding: The extruded pellets were first melted by bringing it lightly in contact with the hot platens (0 psi) for 5 min before compression molding at 230° C. for 15 min and then cooled to room temperature under pressure.

Testing and Characterization: Melt Flow Index (MFI) was determined as per ASTM D1238. Tensile properties [tensile strength (TS), and percentage elongation at yield (E@Y)] and flexural properties [flexural modulus (FM)] were measured according to ASTM D638 and D790, respectively. Shore D hardness (SD) was determined in accordance with ASTM D2240. Differential scanning calorimetry (DSC) test was performed as per ASTM D3418. Percentage crystallinity was determined using DSC as per the method provided by Brzozowska-Stanuch et al. (Brzozowska-Stanuch, A., Rabiej, S., Fabia, J. and Nowak, J., 2014. Changes in thermal properties of isotactic polypropylene with different additives during aging process. Polimery, 59(4), pp. 302-307). Heat Deflection Temperature (HDT) and VICAT Softening Temperature (VSP) of the prepared compositions was determined as per ASTM D648 (Method A) and D1525 (Method A) respectively.

The spherulite morphology of the prepared polypropylene compositions was studied on thin films about 0.1 mm by a Leica DMLP (M/s. Linkam Scientific Instruments, Britain) Polarized optical microscope with an automatic hot stage thermal control. A sample was sandwiched between two microscope cover glasses, melted at 230° C. for 5 min to eliminate thermal history, and then cooled to room temperature at a rate of 10° C./min.

EXAMPLES

Examples 1 to 3 and Comparative Examples 1 to 3, BHETA nucleating agent masterbatch and its subsequent dilution in polypropylene were performed using the twin-screw extrusion process, and samples were prepared by using injection molding process.

Example 1: Example 1 is prepared by addition of 5.0 g (0.50 phr) of BHETA-MB (MB: masterbatch; wherein, concentration of BHETA was maintained at 10 wt. %) in 1000 g of iPP; wherein in the prepared nucleated polypropylene concentration of nucleating agent would be 500 ppm.

Comparative Example 1: Comparative Example 1 is prepared by direct addition of 0.50 g (500 ppm) of BHETA in 1000 g of iPP.

Example 2: Example 2 is prepared by addition of 10.0 g (1.00 phr) of BHETA-MB in 1000 g of iPP; wherein in the prepared nucleated polypropylene concentration of nucleating agent would be 1000 ppm.

Comparative Example 2: Comparative Example 2 is prepared by direct addition of 1.00 g (1000 ppm) of BHETA in 1000 g of iPP.

Example 3: Example 3 is prepared by addition of 20.0 g (2.00 phr) of BHETA-MB in 1000 g of iPP; wherein in the prepared nucleated polypropylene concentration of nucleating agent would be 2000 ppm.

Comparative Example 3: Comparative Example 3 is prepared by direct addition of 2.00 g (2000 ppm) of BHETA in 1000 g of iPP.

Table 1 details the compositions prepared in Examples 1 to 3 and Comparative Examples 1 to 3. Obtained properties for the prepared examples is listed in Tables 2-4.

TABLE 1

Prepared compositions: Examples 1 to 3 and Comparative Examples 1 to 3

| Examples | iPP (g) | Masterbatch Concentration (g, phr) | NA Conc. (ppm) |
|---|---|---|---|
| iPP | 1000 | 0.0, 0.00 | 0.00 |
| Example 1 | 1000 | 5.0, 0.50 | 500 |
| Comparative Example 1 | 1000 | — | 500* |
| Example 2 | 1000 | 10.0, 1.0 | 1000 |
| Comparative Example 2 | 1000 | — | 1000* |
| Example 3 | 1000 | 20.0, 2.0 | 2000 |
| Comparative Example 3 | 1000 | — | 2000* |

Nucleating Agent Conc.: Final concentration of the nucleating agent in polypropylene on addition of BHETA-MB
*Direct addition of 500/1000/2000 ppm of nucleating agent (BHETA) in iPP

TABLE 2

Mechanical properties obtained for
Examples 1 to 3 and Comparative Examples 1 to 3

| Examples | TS (MPa) | E@Y (%) | FM (MPa) | SD |
|---|---|---|---|---|
| iPP | 34.6 | 15.2 | 1480 | 68 |
| Example 1 | 34.9 | 16.2 | 1590 | 69 |
| Comparative Example 1 | 34.4 | 16.6 | 1610 | 68 |
| Example 2 | 34.9 | 16.8 | 1510 | 70 |
| Comparative Example 2 | 35.3 | 16.0 | 1530 | 70 |
| Example 3 | 34.7 | 16.7 | 1500 | 70 |
| Comparative Example 3 | 35.7 | 16.5 | 1460 | 70 |

TABLE 3

DSC analysis data obtained for Examples 1 to 3 and Comparative
Examples 1 to 3

| Examples | Tm (° C.) | Hm (J/g) | Tc (° C.) | Hc (J/g) | % Crystallinity |
|---|---|---|---|---|---|
| iPP | 164.7 | 101.2 | 115.8 | 99.1 | 47.87 |
| Example 1 | 164.5 | 114.7 | 121.5 | 111.7 | 53.96 |
| Comparative Example 1 | 165.6 | 105.9 | 121.7 | 102.3 | 49.42 |
| Example 2 | 165.3 | 103.6 | 120.6 | 102.3 | 49.42 |
| Comparative Example 2 | 164.8 | 108.0 | 121.6 | 105.7 | 51.06 |
| Example 3 | 165.2 | 104.3 | 120.3 | 101.4 | 48.99 |
| Comparative Example 3 | 166.6 | 97.7 | 120.0 | 94.6 | 45.70 |

TABLE 4

Thermal properties obtained for Examples 1 to 3 and Comparative
Examples 1 to 3

| Examples | MFI (g/10 min) | HDT (° C.) | VSP (° C.) |
|---|---|---|---|
| IPP | 12.1 | 100.7 | 153.9 |
| Example 1 | 13.2 | 111.9 | 154.5 |
| Comparative Example 1 | 13.1 | 115.3 | 154.8 |
| Example 2 | 13.3 | 113.0 | 154.4 |
| Comparative Example 2 | 13.6 | 116.0 | 154.4 |
| Example 3 | 13.8 | 113.2 | 154.6 |
| Comparative Example 3 | 14.2 | 115.2 | 154.5 |

Example 4: Example 4 is prepared by addition of 5.0 g (0.50 phr) of BHETA-MB in 1000 g of iPP; wherein in the prepared nucleated polypropylene concentration of nucleating agent would be 500 ppm. Material processed using single-screw extrusion process and samples prepared using injection molding process.

Example 5: Example 5 is prepared by addition of 10.0 g (1.0 phr) of BHETA-MB in 1000 g of iPP; wherein in the prepared nucleated polypropylene concentration of nucleating agent would be 1000 ppm. Material processed using single-screw extrusion process and samples prepared using injection molding process.

Example 6: Example 6 is prepared by addition of 20.0 g (2.0 phr) of BHETA-MB in 1000 g of iPP; wherein in the prepared nucleated polypropylene concentration of nucleating agent would be 2000 ppm. Material processed using single-screw extrusion process and samples prepared using injection molding process.

Example 7: Example 7 is prepared by addition of 5.0 g (0.50 phr) of BHETA-MB in 1000 g of iPP; wherein in the prepared nucleated polypropylene concentration of nucleating agent would be 500 ppm. Material processed using batch mixing process and samples prepared using compression molding process.

Example 8: Example 8 is prepared by addition of 10.0 g (1.0 phr) of BHETA-MB in 1000 g of iPP; wherein in the prepared nucleated polypropylene concentration of nucleating agent would be 1000 ppm. Material processed using batch mixing process and samples prepared using compression molding process.

Example 9: Example 9 is prepared by addition of 20.0 g (2.0 phr) of BHETA-MB in 1000 g of iPP; wherein in the prepared nucleated polypropylene concentration of nucleating agent would be 2000 ppm. Material processed using batch mixing process and samples prepared using compression molding process.

Table 5 details the compositions prepared in Examples 4 to 9. Obtained DSC results for the prepared examples is listed in Tables 6.

TABLE 5

Prepared compositions: Examples 4 to 9

| Examples | iPP (g) | Masterbatch Concentration (g, phr) | NA Conc. (ppm) |
|---|---|---|---|
| iPP | 1000 | 0.0, 0.00 | 0.00 |
| Example 4 | 1000 | 5.0, 0.50 | 500 |
| Example 5 | 1000 | 10.0, 1.0 | 1000 |
| Example 6 | 1000 | 20.0, 2.0 | 2000 |
| Example 7 | 1000 | 5.0, 0.50 | 500 |
| Example 8 | 1000 | 10.0, 1.0 | 1000 |
| Example 9 | 1000 | 20.0, 2.0 | 2000 |

Nucleating agent conc.: Final concentration of the nucleating agent in polypropylene on addition of BHETA-MB

TABLE 6

DSC properties obtained for Example 4 to 9

| Examples | Tm (° C.) | Hm (J/g) | Tc (° C.) | Hc (J/g) | % Crystallinity* |
|---|---|---|---|---|---|
| IPP | 164.7 | 101.2 | 115.8 | 99.1 | 47.87 |
| Example 1 | 166.3 | 103.5 | 121.8 | 102.9 | 49.71 |
| Example 4 | 165.5 | 86.3 | 116.6 | 102.8 | 49.67 |
| Example 7 | 163.8 | 90.3 | 117.1 | 94.1 | 45.46 |
| Example 2 | 165.3 | 103.6 | 120.6 | 102.3 | 49.42 |
| Example 5 | 164.2 | 96.8 | 118.9 | 103.0 | 49.76 |
| Example 8 | 163.1 | 89.9 | 117.2 | 86.2 | 41.64 |
| Example 3 | 165.2 | 104.3 | 120.3 | 101.4 | 48.99 |
| Example 6 | 164.3 | 92.9 | 118.1 | 97.9 | 47.29 |
| Example 9 | 163.7 | 90.3 | 118.4 | 89.1 | 43.04 |

Table 7 details the compositions prepared in Examples 10 to 12. Obtained properties for the prepared examples is listed in Table 8.

Example 10: Example 10 is example 2 mixed with 500 ppm Tween 20 dispersing agent (non-ionic surfactant).

Example 11: Example 11 is example 2 mixed with 500 ppm Span 60 dispersing agent (non-ionic surfactant).

Example 12: Example 12 is example 2 mixed with 500 ppm Span 80 dispersing agent (non-ionic surfactant).

TABLE 7

Prepared compositions: Examples 10 to 12

| Examples | IPP (g) | Masterbatch Concentration (g, phr) | NA Conc. (ppm) | Dispersing Agent (g, ppm) |
|---|---|---|---|---|
| iPP | 1000 | 0.0, 0.00 | 0.00 | — |
| Example 10 | 1000 | 10.0, 1.0 | 1000 | 0.5, 500 |

TABLE 7-continued

Prepared compositions: Examples 10 to 12

| Examples | IPP (g) | Masterbatch Concentration (g, phr) | NA Conc. (ppm) | Dispersing Agent (g, ppm) |
|---|---|---|---|---|
| Example 11 | 1000 | 10.0, 1.0 | 1000 | 0.5, 500 |
| Example 12 | 1000 | 10.0, 1.0 | 1000 | 0.5, 500 |

Nucleating agent conc.: Final concentration of the nucleating agent in polypropylene on addition of BHETA-MB

TABLE 8

DSC properties obtained for Examples 10 to 12

| Examples | Tm (° C.) | Hm (J/g) | Tc (° C.) | Hc (J/g) | % Crystallinity* |
|---|---|---|---|---|---|
| iPP | 164.7 | 101.2 | 115.8 | 99.1 | 47.87 |
| Example 2 | 165.3 | 103.6 | 120.6 | 102.3 | 49.42 |
| Example 10 | 166.1 | 80.2 | 115.3 | 85.4 | 41.26 |
| Example 11 | 165.4 | 95.0 | 114.4 | 101.1 | 48.84 |
| Example 12 | 165.4 | 103.6 | 114.8 | 113.7 | 54.93 |

We claim:

1. A nucleated polypropylene masterbatch composition, comprising:
   a) a polypropylene having a melt flow index ranging in between 1.5 to 40 g/10 minute;
   b) a nucleating agent, wherein the nucleating agent is bis-2-hydroxyethylene terephthalate (BHETA); and
   c) optionally, a dispersing agent, wherein the dispersing agent is a non-ionic surfactant.

2. The composition as claimed in claim 1, wherein the polypropylene is homopolymer and is present in an amount in a range of 40 to 99.9 wt. %.

3. The composition as claimed in claim 1, wherein the nucleating agent is present in an amount in a range of 0.1-60 wt. %, and is prepared from depolymerization of waste polyethylene terephthalate (PET).

4. The composition as claimed in claim 1, wherein the dispersing agent is selected from the group consisting of as tween 20, span 60, span 80 and any combination thereof, and is present in an amount in a range of 0.01 to 10 wt. %.

5. A process for preparation of a nucleated polypropylene masterbatch composition, the process comprising the steps of:
   i. mixing a polypropylene with a nucleating agent and optionally adding a dispersing agent to form a reaction mixture, wherein the nucleating agent is bis-2-hydroxyethylene terephthalate (BHETA);
   ii. feeding the reaction mixture obtained in step i) through a hopper into a extruder;
   iii. maintaining temperature from feeding zone to die zone of the extruder;
   iv. cooling extrudates coming out of the extruder using a water-bath followed by granulation;
   v. drying the granules obtained in step iv) to obtain a polypropylene masterbatch.

6. The process as claimed in claim 5, wherein the polypropylene is homopolymer and is present in an amount in a range of 40 to 99.9 wt. %.

7. The process as claimed in claim 5, wherein the nucleating agent is present in an amount in a range of 0.1-60 wt. %.

8. The process as claimed in claim 5, wherein the extruder is a twin-screw extruder and the masterbatch is prepared in a batch mixer, micro-compounder, single screw extruder or any other processing equipment.

9. The process as claimed in claim 5, wherein the temperature in step iii) is maintained in a range of 150-300° C.

10. The process as claimed in claim 5, wherein temperature of the water-bath in step iv) is maintained at 25° C.-30° C.

11. The process as claimed in claim 5, wherein the drying in step v) is performed in an oven at a temperature of 90-110° C. for about 2-3 hours.

12. The process as claimed in claim 5, wherein the polypropylene masterbatch further diluted to various concentrations using the extruder and the dilution is performed in a batch mixer, micro-compounder, single screw extruder or any other processing equipment.

13. The process as claimed in claim 5, wherein concentration of nucleating agent is diluted in a range from 250-20000 ppm in polypropylene to prepare nucleated polypropylene.

14. The process as claimed in claim 5, wherein the polypropylene is polypropylene homopolymer, and/or polypropylene copolymer with any other alkene or acrylate or halo-alkenes.

15. The nucleated polypropylene claimed in claim 13 showed a crystallization temperature ranging from 115° C. to 122° C. by variation of concentration of nucleating agent, dispersing agent and processing methods.

* * * * *